Oct. 3, 1967 J. J. JECKER ETAL 3,345,234
CONTINUOUS METHOD FOR MAKING DECORATIVE FLOOR COVERING
Filed March 21, 1963
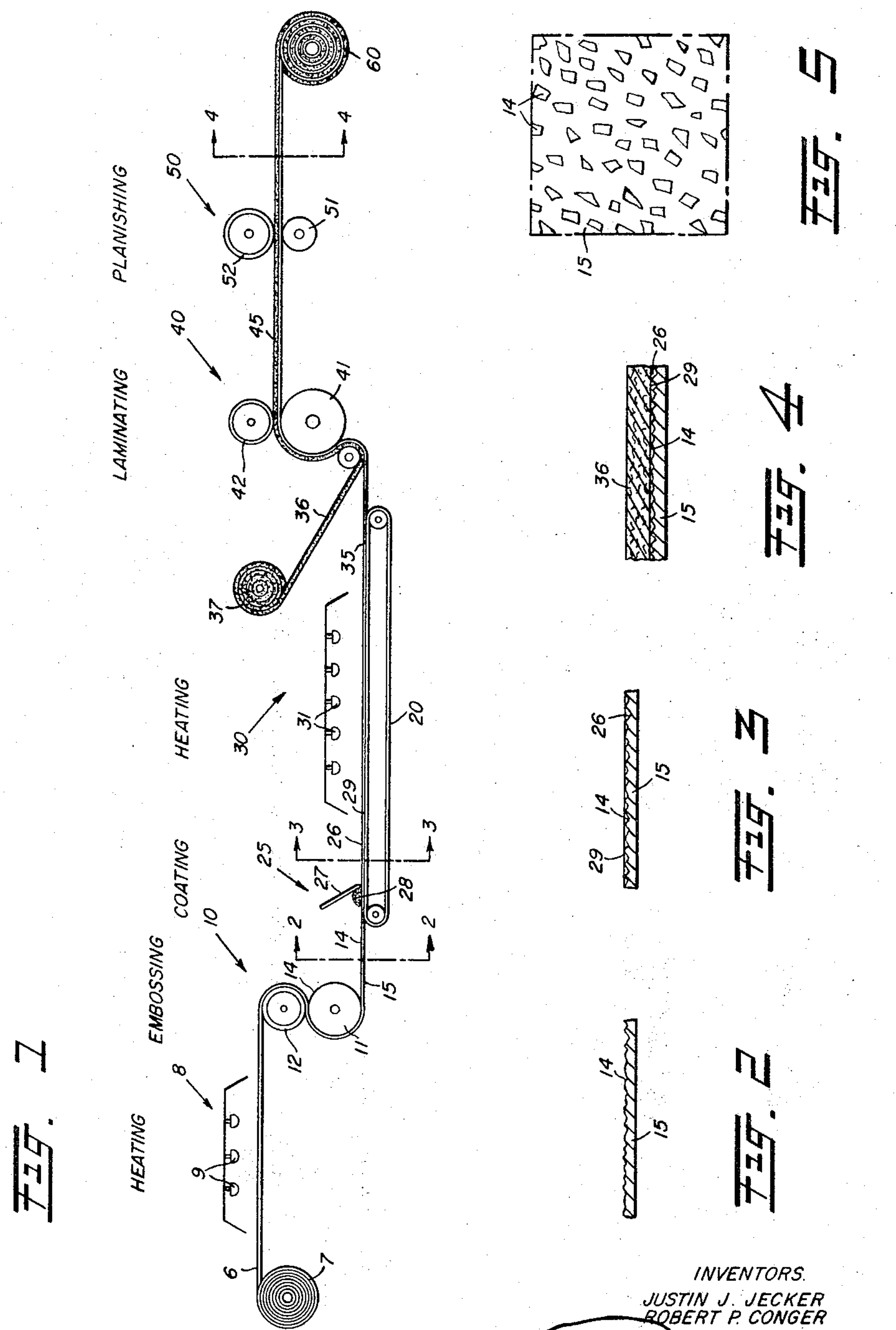
INVENTORS.
JUSTIN J. JECKER
ROBERT P. CONGER
BY Richard J. Laughlin
ATTORNEY United States Patent Office 3,345,234

Patented Oct. 3, 1967

3,345,234

CONTINUOUS METHOD FOR MAKING DECORATIVE FLOOR COVERING

Justin J. Jecker, Newfoundland, and Robert P. Conger, Park Ridge, N.J., assignors to Congoleum-Nairn Inc., Kearny, N.J., a corporation of New York Filed Mar. 21, 1963, Ser. No. 266,889
5 Claims. (Cl. 156—209)

This invention relates to decorative surface coverings for floors, walls, ceilings, countertops, structural materials and the like and, in particular, to plastic coverings which have scintillating appearance of depth and to a method of producing such plastic surface coverings.

This application is a continuation-in-part of our copending application Ser. No. 237,549, filed Nov. 14, 1962, now U. S. Patent No. 3,180,779 and issued on Apr. 27, 1965.

Plastic surface coverings comprising a resinous binder, stabilizer, filler and colored pigmentations have come to be widely used in various building materials, such as coverings for floors, walls and the like. These products have excellent wearing properties and resistance to attack by household chemicals. They have been prepared in a wide range of patterns and decorations simulating, for example, most of the effects which can be produced with stone materials, such as marble and terrazo. In comparison to stone materials, they have the advantage of greater resilience which renders them more comfortable underfoot. In addition, they do not flake and chip when subjected to sharp impacts which is an undesirable feature of stone materials. The surfaces are generally non-porous and, therefore, readily cleanable.

Recently, plastic surface coverings having a translucent appearance have been produced in an attempt to create a surface covering having a dimensional effect. In the method now in use for producing such products, a batch of transparent plastic composition is formed and blended with separate batches of plastic composition pigmented in each of the colors desired in the finished product. This blend is then pressed or molded to produce the finished product. Plastic surface coverings so prepared have a number of significant disadvantages. Although the product appears to be translucent when held in the hand in front of a light, there is little, if any, three-dimensional effect when it is installed against a surface. An installation of such products merely resembles a modified form of a marbleized decoration which has been available for many years. In addition, portions of the undersurface are visible which necessitates careful selection and installation of the product.

The use of embossing techniques have also been utilized for producing three-dimensional surface coverings. Such process usually involves the passing of a composition sheet through an embossing roll or molding the surface of the product against an embossed plate. Very desirable and varied effects can be obtained by this method. The product, however, defeats one of the main purposes of the plastic type of surface coverings, in that it does not provide a smooth, readily cleanable surface. As is apparent, the embossed depressions collect dirt and are, therefore, difficult to maintain. Attempts have been made to cover the embossings with translucent layers so that such an embossed product has a smooth surface. Extreme care must be exercised in such an operation when applying any pressure to prevent the collapse of the embossings.

An object of the invention is to produce a decorative plastic surface covering having a three-dimensional appearance. Another object of the invention is to produce a plastic surface covering which directs reflected light. Another object of the invention is to produce a plastic surface covering having light deflecting and non-reflecting areas which change position as viewed from different positions. A further object is to produce a product having a scintillating appearance. An additional object of the invention is to provide a process for producing such a plastic surface covering. Other objects and the advantages of the invention will appear from the following detailed description.

In accordance with the invention, a decorative plastic surface covering having a directed-light and/or a three-dimensional appearance is produced by embossing or otherwise depressing areas into one surface of a sheet to a substantial depth, coating the embossed surface of the sheet with a thermosetting resinous composition or a high temperature resistant thermoplastic composition to fill in the depressions caused by the embossing operation, heating the coating to cure the composition and then, if desired, laminating the embossed and coated sheet to a second sheet of thin or substantial thickness. It is essential to the invention that the surface beneath the embossing be reflective so that the embossed areas are visible when viewed from the surface of the product. The degree of reflectivity is not critical although it preferably reflects at least 20% of the light. The resulting product has a smooth surface while possessing a directed-light and/or a three-dimensional appearance created by the appearance of the embossing through the depth of the film. The use of the thermosetting or high temperature resistant thermoplastic composition fixes the embossings and allows the product to be subjected to the heat and pressure of processing without distorting or losing the embossing. The high temperature resistant thermoplastic composition must be able to withsand the subsequent processing to prevent distortion of the embossing. The temperature resistance required, therefore, will vary with the particular processing conditions. Temperatures in the range of from 150° F. to about 400° F. are conventionally used. A particularly attractive product can be obtained by metalizing the surface of the sheet to be embossed. The metalizing can be accomplished by depositing a thin coating containing fine metal flakes. The metal coating serves as a reflective surface, giving the product bright and dull areas when embossed in a light-directing manner and a scintillating appearance when embossed properly as in the lenticular manner. In addition, various designs can be printed on the sheet prior to embossing to give the product added variation in design. The sheet produced with or without a base can be cut into regular or irregular chips and used for application as decorative chips to be pressed into a thermoplastic base sheet, such as in the processes disclosed in U.S. Patent 2,888,975, dated June 2, 1959, issued to W. E. Benedict, and U.S. Patent 2,962,081, dated Nov. 29, 1960, issued to J. F. Dobry, et al.

The invention can be better understood from the following detailed description when read in conjunction with the drawings wherein.

FIGURE 1 is a schematic representation of one method for producing the directed-light and/or three-dimensional decorative surface covering of the invention;

FIGURE 2 is a cross-sectional view of the embossed transparent film;

FIGURE 3 is a cross-sectional view of the embossed film with the embossed areas filled in with a reflective resinous coating;

FIGURE 4 is a cross-sectional view of the final product inversed; and

FIGURE 5 is a plan view of the finished product.

With reference to FIGURE 1, a transparent or translucent sheet 6 of resinous composition is fed from a supply roll 7 to a heater 8, such as a bank of infra-red heat lamps 9. The heating raises the temperature of the sheet to a point where it is readily deformable. The heated sheet is then passed through an embossing apparatus, generally indicated at 10. The embossing apparatus comprises a metal roll 11 engraved with the desired design 14, and a resilient-covered back-up roll 12 which presses the sheet against the engraved roll. The sheet is allowed to be carried by the engraved roll for a distance of its rotation to fix the embossed design 14 in the sheet. The embossed sheet 15 is then placed onto a continuous conveyor 20 which conveys the sheet through a coating apparatus, generally indicated at 25. The coating apparatus applies a thin layer 26 of the resinous composition over the surface of the sheet, sufficient to fill in the embossed depressions. The coating apparatus can be any type of coater, such as a reverse roll coater or simply a doctor blade 27 which controls the amount of coating composition which is placed on the web from a reservoir 28 of the composition held back by the blade 27. The coated sheet 29 is then passed through an oven, generally indicated at 30 which can have any type of heat source, such as a bank of infra-red heating lamps 31. The oven heat causes the evaporation of any solvent in the coating composition and cures the composition.

The cured sheet 35 is then fed to the laminating step, generally indicated at 40. The laminator can comprise a steel roll 41 and a steel back-up roll 42 having a resilient cover, such as rubber. A backing sheet 36 is supplied to the laminator from supply roll 37. The backing sheet 36 is placed on the surface of the sheet. The laminating drum 41 is preferably maintained at a temperature sufficient to aid in the lamination. The laminated product is allowed to travel on the surface of the drum 41 thereby dissipating as much as possible of the heat. As an alternate procedure, an adhesive is applied to the surface of the film or backing to secure the sheets together. When using this alternative, the adhesive is allowed to set while carried on the laminating drum. The product 45 can then be further cooled, if necessary. The laminated product can be fed to a planisher, generally indicated at 50, if it is desired to place a higher gloss on the surface of the product. The planisher usually comprises a hard surface roll 51 and a resilient-covered back-up roll 52. The laminated product is then wound on a collecting drum 60. The laminate can be used directly as a floor, wall or other surface-like covering or secured to the surface of a structural material, for example, a plywood sheet. Many other uses of the product will occur to those skilled in the art.

The sheet which forms the backing or undersurface of the product of the invention can be a wide range of products. Strength is important in order that the product withstand the strains occurring both during manufacture, installation and use of the product. In the case of a flexible resilient product useful as a floor covering, the backing should also have sufficient flexibility to permit the product to be rolled and unrolled without cracking or tearing. Suitable backing sheets, however, can also include those formed of resinous compositions. Any of the thermoplastic or elastomeric resinous compositions which can be calendered or pressed to form a flexible sheet can be used to form a backing web for use in the invention. Such resins as butadiene-styrene polymer, polymerized chloroprene, polyvinyl chloride, polyvinyl acetate, vinyl chloride-vinyl acetate copolymers and the like can be compounded with plasticizers and fillers and sheeted to form a flexible sheet. In some cases, scrap and degraded resinous compositions can be salvaged by forming them into sheets which are useful as backing sheets in producing products in accordance with the invention.

Suitable backing sheets also include woven and non-woven fabrics, such as burlap, and those formed from cotton, wool and various synthetic fibers, paper, aluminum foil, wood and the like. It has been found that felted cellulosic or asbestos fibrous sheets impregnated with a water-proofing and/or strengthening impregnant are highly desirable backings for products prepared in accordance with the invention since they are low in cost and yet are flexible and strong. Numerous fibrous materials can be used in preparing a fibrous backing for use in the invention. A slurry of fibrous material in water can be formed into a sheet using any of the techniques conventionally employed in the manufacture of paper. For example, sheet formation can take place on a Fourdrinier or cylinder paper machine. The fibrous sheet so prepared is then dried to remove the water.

As indicated above, felted fibrous sheets, when used for backings, are normally impregnated with a water-proofing and/or strengthening impregnant in order to impart improved strength and water resistance to the sheet. The particular impregnant must not only be able to impart strength and water resistance to the sheet of felted fibers, but must also have certain desirable high temperature properties to allow them to be subjected to the processing temperatures required. The impregnant should be free of any volatile components and also it must not soften to such an extent as to exude from the sheet. In addition, the impregnant should not be subject to any detrimental chemical change, such as oxidation, at these processing temperatures.

Suitable impregnants include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins, such as drying oils and the like, isocyanates and polyurethanes, modified acrylics by the use of cross linking agents, modified polyvinyl chlorides and the like are suitable.

The impregnants can be incorporated into the felted fibrous sheet by passing the web through an emulsion or solution of the resin followed by drying of the sheet to remove the solvent. Alternately, the resin can be added in fine particles to the fiber furnish prior to sheet formation either as solid particles of resin or as an emulsion in water from which fine particles of resin are precipitated onto the fibers.

The wear layer of the product of the invention can be transparent, partially transparent, translucent or printed film or coating. The film comprises a thermoplastic or thermosetting resinous binder, including plasticizer, stabilizer and, in some instances, fillers. Various amounts of pigments or dye can be used to give the wear layer different degrees of translucence.

The resinous binder used in the wear layer composition is coalesced, fused or cured into a continuous film by the application of heat. The resinous binder in the coating composition must be compatible with any laminating adhesive used. The invention is adapted to the preparation of both flexible and rigid decorative sheets, but a flexible product is most desirable for use as a resilient surface covering.

The thermoplastic resinous binder can be made up solely of thermoplastic resinous material, but it normally comprises a mixture of a thermoplastic resin and one or more plasticizers. Useful thermoplastic resins include polymers and copolymers of acrylic and methacrylic acids and their derivatives, the vinyl resins, polystyrene, polymerized methylstyrene, polybutadiene and the like. Polymers of vinyl chloride have been found particularly effective in the formation of compositions in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, allyl chloride, allyl ethyl ether and the like; and conjugated and cross-conjugated ethylenically unsaturated compounds such as butadiene, isoprene, chloroprene, 2,3-dimethylbutadiene-1,3 piperylene, divinyl ketone and the like. As already discussed, resinous material can be produced which has satisfactory flexibility at normal temperatures without the presence of plasticizers to be useful as the resinous binder in the film. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins, such as butadiene-styrene copolymer, butadiene-acrylonitrile copolymer, polymerized chloroprene, natural rubber and the like can also be used as resinous binders in the formation of coatings for use in the invention.

The film composition can contain pigments in accordance with the particular design effect desired in the finished product. For example, where white is desired, titanium dioxide, either alone or with extenders, such as barium sulfate, calcium sulfate, magnesium carbonate, magnesium silicate and the like, can be used. For other colors, any of the well-known organic and inorganic pigments for resinous compositions can be used.

The wear layer composition usually also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol, salicylate, and organic phosphates and other complexes of such metals as barium, cadmium, strontium, lead, tin and the like. Suitable heat stabilizers include sulfides and sulfites of silver, calcium, cadmium, magnesium, cerium, sodium, strontium, and the like, glycerine, leucine, alanine, o- and p-amino benzoic and sulfanilic acids, hexamethylene tetramine, weak acid radicals including oleates recinoleates, abietates, salicylates and the like. Normally, the composition contains from 0.5 to 5 parts stabilizer per 100 parts resin.

The wear layer can be formed by any of the conventional methods of film formation. Normally, the various components of the film are mixed in a suitable mixer, such as a Banbury, at a temperature which causes the resinous component to become soft thereby forming a homogeneous mixture. This temperature varies with the particular resinous component but is usually between about 250° and about 375° F. The composition is then sheeted by passing through a series of calender rolls. The calender rolls are normally heated at a temperature of from about 25° to about 100° F. below the mixing temperature. The sheet is thereafter cooled and wound on a collecting roll.

The thickness of the film is not critical to the invention, although it is necessary for the layer to have sufficient thickness to give the product a reasonable wear life, dependent on its ultimate use. A minimum wear thickness for flooring would be at least about 0.003 inch and preferably about 0.006 inch. As a general rule, the wear layer is not over 0.250 inch in thickness.

The embossing can be accomplished by any of the conventional methods which usually involve heating the surface of the film and subjecting the film to high pressure of the order of 500 to 1,000 pounds per square inch. The embossing apparatus usually comprises a steel embossing roll engraved with the desired design to be embossed and a resilient-covered back-up roll which forces the sheet against the embossing roll. The sheet is normally allowed to be carried on the embossing roll so that the embossings have an opportunity to set in the film.

The embossings must be of sufficient depth so that in the final product, they will give the product a directed-light and/or a three-dimensional appearance. As a general rule, the embossings must have a depth of at least 0.0005 inch. The embossings can take any design depending on the appearance desired in the final product. A particularly effective product is obtained by embossing a pattern in grooves representing a fresnel-type lenticular pattern wherein the grooves are progressive in depth and each ridge has one side perpendicular to the plane of the sheet and the other side at an angle thereto. With an embossed pattern such as this, there is produced a gradient in light reflected from the material. Such an embossing technique is disclosed in U.S. Patents 2,875,543 and 2,958,148 issued to Sylvester et al. If the embossed surface of the film has a highly reflective surface, as a metal coating, a scintillating effect is obtained in the product.

Unusually decorative effects are obtained when a design in one or more colors is printed on the film prior to embossing. The printing can be transparent, translucent or opaque, depending on the effect desired. A wide range of effects can be obtained if the rotogravure technique of printing is used wherein fine dots of color are applied to the surface of the film in the form of circles, squares, triangles and the like as is conventional in rotogravure printing. If the dots of color are correlated with the size, width and depth of the embossing, it is possible to obtain striking color effects. Particularly good results are obtained by printing a design with about 35 to 120 lines per inch and a lenticular or other type embossing having grooves spaced from 1/30 to 1/100 of an inch apart and a depth varying from about .001 to about .005 inch. Additionally very decorative effects can be obtained by having the embossed area in register with the printed design. By this latter method the particular embossing in an area can be selected to correspond or complement the design printed in an area.

The depressed portions of the embossed sheet are filled in with a thermosetting or high temperature thermoplastic resin and the resin cured. The cured resin gives strength at high temperatures and pressures to the embossed sheet so that the embossed design is not lost in processing. The application of this resin need be only sufficient to fill in the depressions. The resin can be applied by any of the conventional operations of coating, calendering or molding. The resin, therefore, can be applied in solution or suspended in a liquid vehicle, a preformed sheet can be placed on the embossed sheet or solid particles can be used to fill in the embossings. In the first case, a heating step is only required; in the latter two cases, a pressing step is required to form and mold the solid material into the depressions. The temperatures and pressures required for such operations will vary widely depending on the particular resin. As a general rule, a temperature of about 200° F. to about 375° F. is required to cure the resin although some can be cured at room temperatures. The time of heating will vary with the type of heating apparatus used.

The thermosetting and thermoplastic resin compositions which can be used in accordance with the invention to fill in the embossings are preferably flexible in the cured state and resistance to degradation by light and heat. Typical of the thermosetting resins which can be used are the phenolics, urea-formaldehydes, melamines, polyesters, polyurethanes, epoxy, alkyds, acrylics, allyl, and diallyl phthalates. The thermoplastic can be any of the thermoplastic resins, such as polyvinyl chloride and its polymers, polyvinyldichloride, polyethylene, polypropylene, acetals, such as polyoxymethylene, chlorinated polyether, cellulose esters, such as the acetate and butyrate, polystyrenes, polyvinylfluoride and polyamites. As indicated above, care must be exercised in selecting the resin so that it does not deform at the processing temperatures. The resin can contain plasticizers and stabilizers such as described above for the wear layer composition.

As indicated previously, it is essential to the invention that the areas or sheet under the embossed areas be reflective so that the desired optical effect is obtained. The reflective surface, therefore, can be the composition used to fill in the embossing, an additional coating or the base. The reflective properties can be imparted by use of metal foils, metallic inks and pigments, color pigmented composition, vacuum metalized plastic film, metal foil chips and the like. As indicated above, the sheet is preferably at least 20% reflective.

The embossed and coated film can be laminated to the sheet which forms the backing by a variety of methods. An adhesive can be applied to either or both surfaces. Suitable adhesives are those which are compatible with both the film and the backing. A particularly suitable adhesive is a composition comprising a vinyl chloride-vinyl acetate copolymer which is modified by the presence of carboxyl groups, suitably introduced by combining maleic anhydride into the reactants during polymerization. The adhesive further preferably contains a polymerized alkyl acrylate or methacrylate. Other modifying agents which can be included in the adhesive to impart specific properties include chlorinated biphenyl resins, nitrile rubbers, partially hydrolyzed vinyl chloride-vinyl acetate copolymers, or modified alkyl resins, pigments and fillers, such as mica, silica and talc. Other suitable adhesives and a process for lamination is disclosed in U.S. Patent 2,757,711, which issued on Aug. 7, 1956, to Petry et al. An adhesive layer of 0.0003 to 0.002 inch in thickness has proven particularly effective, although the thickness of the adhesive is not critical. The adhesive layer is preferably continuous.

The pressure supplied in the laminating step is of particular importance. If the pressure is too great, it can cause loss of the embossings thereby destroying or substantially eliminating the desired optical effect. As a general rule, the pressure is preferably about 5 to about 40 pounds per inch of sheet width which is calculated by dividing the total pressure between the laminating rolls by the width of the sheet.

The following examples are given for purposes of illustration:

*Example 1*

The following composition was mixed in a Banbury mixer at a temperature of 350° F.:

| | Parts |
|---|---|
| Polyvinyl chloride (35,000 average molecular weight) | 100 |
| Dioctyl phthalate | 33 |
| Barium-cadmium laurate | 2 |
| Epoxyized soya oil | 2 |
| Carnauba wax | 0.4 |

The mixed composition, while hot, was sheeted between calender rolls heated to a temperature of about 250° F. to yield a clear, transparent sheet of approximately 0.008 inch in thickness. The sheet was then heated to about 325° F. and passed through an embossing apparatus. The embossing roll is maintained at a temperature of about 325° F., which embossed an overall design into the one side of the film to a depth varying from about 0.001 to about 0.002 inch. The embossed design is a lenticular configuration formed of a series of spaced, irregularly-shaped elements wherein each element resembles a fresnel lens and contains a series of sharply peaked ridges which in cross-section are formed with the sides of the ridges steeper on one side than on the other, and with the grooves varying progressively in depth along the cross-section with respect to the angles at the peaks of the successive ridges and with the slopes of the sides of the ridges with the largest peak angles located at the ridges adjoining the shallowest grooves. The grooves were about 0.02 inch apart.

The following composition was then coated on the surface of the base to fill in the embossings:

| | Percent by weight |
|---|---|
| Long chain polyester [1] (isocyanate equivalent [2] of 173 | 14.4 |
| Long chain polyester [3] (isocyanate equivalent of 33) | 14.4 |
| Cellulose acetate butyrate (10% solution in ethyl acetate) | 5.8 |
| Polyisocyanate [4] | 23 |
| Pigment ($TiO_2$) | 4.3 |
| Ethyl acetate | 7.6 |
| Butyl acetate | 7.6 |
| Toluene | 7.6 |
| Methyl cellosolve acetate | 15.3 |
| | 100.0 |

[1] Multron R-12, Mobay Chemical Co., St. Louis, Mo.
[2] Isocyanate equivalent is the number of milligrams of —NCO group equivalent to the active hydrogen atoms in 1 gram of the polyester.
[3] Multron R-16, Mobay Chemical Co., St. Louis, Mo.
[4] Polyisocyanate prepared by reacting 3 mols of tolylene diisocyanate with 1 mol of trimethylol propane. The resulting compound contains three —NCO groups per molecule and has a molecular weight of 656.

In the preparation of the coating, the polyesters were blended with solvents and then added to a 75 percent by weight solution of the polyisocyanate in methyl cellosolve acetate. The resulting coating had a viscosity of 50 centipoises and contained 56.6% non-volatile material.

The coated sheet was air dried for ten minutes to permit preliminary evaporation of the solvent and then cured at 275° F. for a period of 30 minutes.

A cellulosic felt sheet of approximately 0.046 inch in thickness, impregnated with about 10 percent of polyvinyl acetate and about 30 percent of a petroleum resin having a softening point of 125° F. is coated on one surface with a white pigmented coating of the following composition:

| | Parts |
|---|---|
| Copolymer of vinyl chloride (90%) and dibutyl maleate latex (50% solids) | 30 |
| Copolymer of butadiene (67%) and acrylonitrile (33%) latex (50% solids) | 30 |
| Sodium alkyl aryl sulfonate | 2 |
| Titanium dioxide | 14 |
| Whiting | 54 |
| Methyl cellulose suspension (7% solids) | 15 |
| Water | 20 |

The coating is subjected to heat of 115° F. for about 100 minutes to remove the volatiles. The coated felt is then coated with an adhesive having the following composition:

| | Parts |
|---|---|
| Vinyl chloride-vinyl acetate (87/12) copolymer modified with 1% maleic anhydride | 10 |
| Acrylonitrile-butadiene rubbery copolymer (35/65) | 10 |
| Methyl ethyl ketone | 60 |
| Methyl isobutyl ketone | 20 |

The coated felt was passed beneath a series of infra-red heat lamps to raise the temperature of the coating to 400° F. The felt was then passed through cold laminating rolls (60° F.) simultaneously with the embossed and coated film, with the embossed side of the laminate contacting the adhesive coating. The laminate product is allowed to remain in contact with one of the laminating rolls to allow the product to cool. The laminate is then further cooled by passing over cooling rolls and then wound on a collecting roll.

The film layer of the product is integrally bonded to the felt with excellent resistance to delamination. The embossed areas of the film have retained their sharp definition. The embossing, as viewed through the film, gives an appearance of depth to the product. It also directs the reflected-light from each area in two directions so that there are bright and dull areas on the material. When a person moves about these areas change, for instance, from bright to dull and then back to bright again. The product can be used as a floor, counter, or wall covering, or cut into any desired shape for such uses, for example, into tile.

*Example 2*

A clear, transparent sheet of 0.008 inch in thickness was prepared as in Example 1. The sheet was coated on one side with the adhesive composition described in Example 1. The adhesive coating was 0.0005 inch thick. The coated transparent sheet was then passed beneath a series of infra-red heat lamps to raise the temperature of the adhesive to 400° F. An aluminum foil 0.0015 inch thick was pressed in contact with the heated adhesive and then the laminate passed through an embossing roll similar to Example 1. The embossing extended for an average depth of 0.002 inch. The embossed side of the aluminum foil was coated with the following composition:

| | Parts |
|---|---|
| Acrylic terpolymer latex [1] (50% solids) | 100 |
| 2,5-di-tert-butylhydroquinine | 0.5 |
| Maleic acid | 0.5 |
| Hydroxy ethyl cellulose | 1.0 |

[1] Polymer contains 40% ethyl hexyl acrylate, 40% lauryl methacrylate and 20% butylacrylate.

The coating was applied at an equivalent thickness of 0.002 inch. The coating was cured by heating for about one-half minute at 280° F. After curing the sheet was cooled and the same adhesive was applied to the acrylic coated surface of the laminate. The adhesive coating was 0.0015 inch thick. The adhesive coating was heated to 400° F. and laminated to a vinyl composite sheet 0.050 inch thick. The vinyl composite sheet had the following composition:

| | Parts |
|---|---|
| Copolymer of vinyl chloride 97% vinyl acetate 3% | 100 |
| Dioctyl phthalimate | 40 |
| Limestone | 200 |
| Asbestos fiber | 20 |
| Stabilizer | 12 |
| Pigment | 28 |

The product was excellent for use as a floor covering and had a very scintillating appearance.

*Example 3*

An asbestos felt sheet impregnated with 20% by dry weight of the sheet with a copolymer of butadiene and acrylonitrile of approximately 0.04 inch in thickness was coated on one surface with the following composition:

| | Parts |
|---|---|
| Copolymer of vinyl chloride (90%) and dibutyl maleate latex (50% solids) | 30 |
| Copolymer of butadiene (67%) and acrylonitrile (33%) latex (50% solids) | 30 |
| Sodium alkyl aryl sulfonate | 2 |
| Titanium dioxide | 14 |
| Whiting | 54 |
| Methyl cellulose suspension (7% solids) | 15 |
| Water | 20 |

The coating was heated to 115° F. for about one and a half hours to remove the volatiles in the coating. The coated side of the felt was then coated with adhesive and heated following the procedure of Example 1. An 0.001 inch thick film of vacuum metallized Mylar was adhered to the heated adhesive and passed through an embossing apparatus as in Example 1. The embossing extended to a depth of 0.003 inch. The following composition was applied to the embossed sheet to fill in the embossings:

| | Parts |
|---|---|
| Medium molecular weight epoxy resin of the bisphenol A type [1] | 70 |
| Straight chain diglycidyl ether flexibilizer | 30 |
| N-amino ethyl piperazine | 11.5 |

[1] DER332 manufactured by Dow Chemical Company, Midland, Mich.

The coating was then heated at 140° F. for four hours to cure the resin. The product had excellent wear resistance making it particularly useful as a table top covering. The product had a definite three-dimensional appearance.

*Example 4*

A vinyl composition sheet having the following formula was prepared by calendering between heated rolls:

| | Parts |
|---|---|
| Copolymer of vinyl chloride 97% vinyl acetate 3% | 100 |
| Dioctyl phthalimate | 40 |
| Limestone | 200 |
| Asbestos fiber | 20 |
| Stabilizer | 12 |
| Pigment | 28 |

The calendered sheet having a thickness of 0.050 inch was then coated on one surface with an adhesive and heated in the same manner as described in Example 1. An aluminum foil having a thickness of 0.0015 inch was then laminated to the heated adhesive, and then passed through an embossing apparatus following the embossing procedure described in Example 1. The embossed side of the aluminum foil was then coated with the following adhesive:

| | Parts |
|---|---|
| Adduct prepared by reacting 2 mols of toluene diisocyanate with 1 mol of polytetramethylene glycol ether adipate (2,000 molecular weight) | 100 |
| 1,4-butane diol | 3.5 |
| Trimethylolpropane | 1 |

The coating filled in the embossed areas to form a smooth layer on the surface of the sheet. The composition had been heated to 212° F. and then cast to form the coating. The coating was then cured for one hour at 250° F., followed by a seven-day post-cure at approximately 70° F. The product had excellent wear resistance and could be readily used as a wall covering. The embossings as seen through the surface of the product gave the product a scintillating appearance.

*Example 5*

A sized kraft paper sheet of 0.010 inch in thickness was coated on one surface with the following adhesive:

| | Parts |
|---|---|
| Terpolymer of vinyl chloride (86%), vinyl acetate (13%), maleic acid (1%) | 100 |
| Methylethylketone | 150 |

The adhesive was heated to 350° F. and an aluminum foil having a thickness of 0.00035" was laminated to the surface of the adhesive. The laminate was then passed through an embossing apparatus similar to that described in Example 1. The embossings were then filled in to form a smooth sheet by the application of the following composition:

| | Parts |
|---|---|
| Phenol-formaldehyde condensation product (2 mols of formaldehyde with 2 mols of phenol) | 100 |
| Hexamethylene tetramine catalyst | 9 |

The coating was cured at 150° F. for one hour. The product produced was suitable for use as a wall covering. The product had a high wear resistant and readily cleanable surface. Due to the light-reflecting nature of the embossed aluminum foil, the product had a scintillating appearance.

Any departure from the foregoing description which conforms to the invention is intended to be included within the scope of the claims.

What is claimed is:

1. A continuous method of making a decorative surface covering having a transparent resinous wear layer and a fibrous backing layer, comprising:
   (a) preheating a surface of the resinous wear layer,
   (b) embossing on said surface a pattern having a depth of at least 0.0005 inch,
   (c) applying a thermosetting resin having a contrasting color into the embossed depressions, and not leaving any substantial amount of said thermosetting resin on the surface of said wear layer which is not depressed,
   (d) heating said thermosetting resin to its curing temperature; and
   (e) laminating said backing layer to said embossed resinous wear layer.

2. The process of claim 1 wherein said thermosetting resin is an acrylate having a curing temperature of less than about 375° F.

3. The process of claim 1 wherein said thermosetting resin is a polyurethane having a curing temperature of less than about 375° F.

4. The process of claim 1 wherein said thermosetting resin is an epoxy having a curing temperature of less than about 375° F.

5. The process of claim 1 wherein said film composition is a vinyl chloride polymer composition and said heating to cure is carried out at a temperature of less than about 375° F.

References Cited

UNITED STATES PATENTS

| | | | |
|---|---|---|---|
| 1,990,173 | 2/1935 | Finley. | |
| 2,128,390 | 8/1938 | Zerilli | 161—119 X |
| 2,330,718 | 9/1943 | Kallmann | 161—6 X |
| 2,392,594 | 1/1946 | Karfiol et al. | 161—119 |
| 2,404,073 | 7/1946 | Karfiol et al. | 156—209 |
| 2,617,750 | 11/1952 | Le Clair et al. | 161—254 |
| 3,000,754 | 9/1961 | Zentmyer | 161—6 X |
| 3,012,285 | 12/1961 | Marcus et al. | |
| 3,044,202 | 7/1962 | Lindmark | 161—119 X |
| 3,137,609 | 6/1964 | Blaska | 161—2 |
| 3,150,031 | 9/1964 | Powell | 161—122 |
| 3,155,764 | 11/1964 | Gill | 88—82 |
| 3,180,779 | 4/1965 | Conger et al. | 161—6 |

JACOB H. STEINBERG, *Primary Examiner.*

J. H. STEINBERG, *Examiner.*

J. J. BURNS, *Assistant Examiner.*